US006332731B1

(12) United States Patent
Wycech

(10) Patent No.: US 6,332,731 B1
(45) Date of Patent: Dec. 25, 2001

(54) THREE DIMENSIONAL COMPOSITE JOINT REINFORCEMENT FOR AN AUTOMOTIVE VEHICLE

(75) Inventor: Joseph S. Wycech, Grosse Pointe Shores, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/476,925

(22) Filed: Jan. 4, 2000

Related U.S. Application Data

(63) Continuation-in-part of application No. 09/018,387, filed on Feb. 4, 1998.

(51) Int. Cl.⁷ .................................................... F16B 12/04
(52) U.S. Cl. ........................ 403/171; 403/269; 403/265; 296/30; 156/293
(58) Field of Search .................................... 403/265, 266, 403/267, 268, 269, 171, 176; 296/29, 187, 30, 203.01; 156/79, 293, 294

(56) References Cited

U.S. PATENT DOCUMENTS

| | | |
|---|---|---|
| 5,575,526 | 11/1996 | Wycech . |
| 5,720,510 * | 2/1998 | Daniel et al. ........................ 296/188 |
| 5,806,919 | 9/1998 | Davies . |
| 5,885,494 * | 3/1999 | Venkataraman et al. ........... 264/46.5 |
| 5,915,781 * | 6/1999 | DeRees ................................. 296/203 |
| 6,068,424 * | 5/2000 | Wycech ................................. 403/269 |
| 6,135,542 * | 10/2000 | Emmelmann et al. .............. 296/205 |

FOREIGN PATENT DOCUMENTS

| | | |
|---|---|---|
| 19603098 | 3/1997 | (DE) . |
| WO 9743501 | 11/1997 | (WO) . |

* cited by examiner

Primary Examiner—Lynne H. Browne
Assistant Examiner—Kenn Thompson
(74) Attorney, Agent, or Firm—Wayne C. Jaeschke; Stephen D. Harper; Harold Pezzner

(57) ABSTRACT

The joint reinforcement member for a hollow structure of an automotive vehicle has a carrier portion with an outer surface. The carrier portion has a base portion with a first extension having a first longitudinal axis and a second extension having a second longitudinal axis. The first longitudinal axis and second longitudinal axis correspond to the hollow structure. A thermally expandable adhesive layer is disposed on the outer surface of the carrier portion and substantially covers the outer surface. A method for forming the joint member includes providing a carrier having a plurality extensions extending from a base portion that correspond to the hollow structure a layer of thermally expandable adhesive materials applied to the carrier portion. The carrier portion is heated to activate the adhesive layer. The adhesive layer is cooled so that the adhesive layer is bonded to the structural member. The reinforcement member may be inserted into the hollow structure of an automotive vehicle before assembly of the vehicle so that during a paint bake operation, the adhesive portion is heated and bonded to the structure of the vehicle.

30 Claims, 2 Drawing Sheets

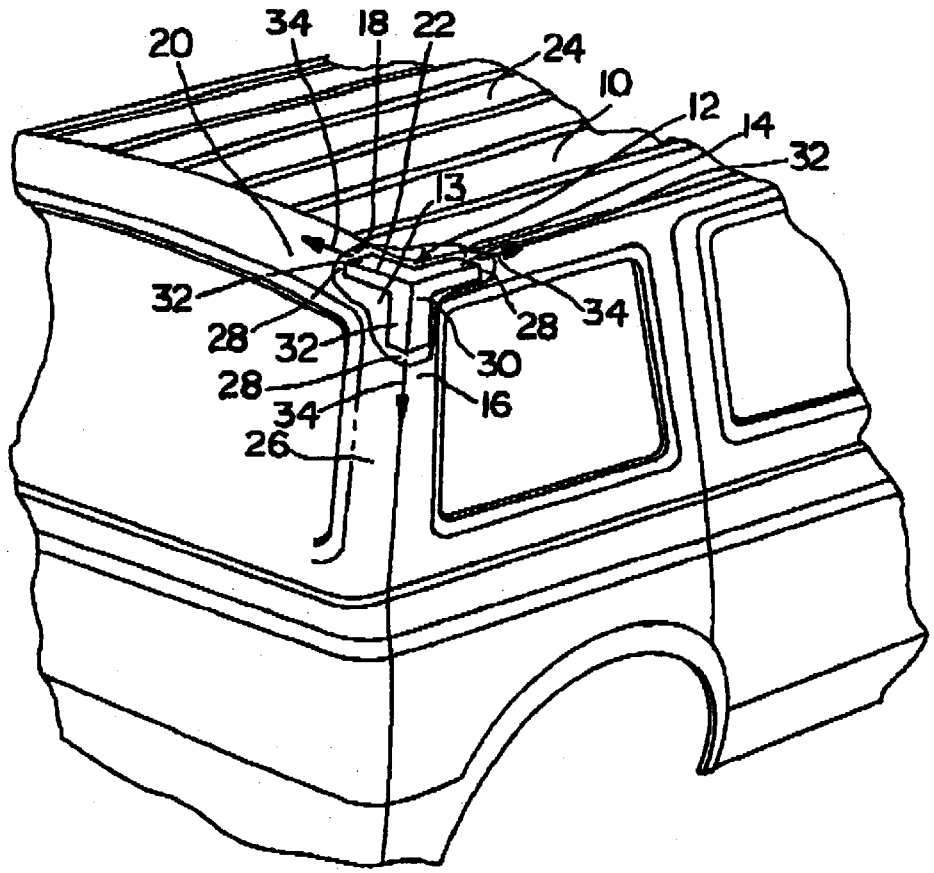
FIG. 1
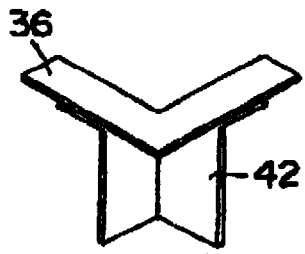
FIG. 2A
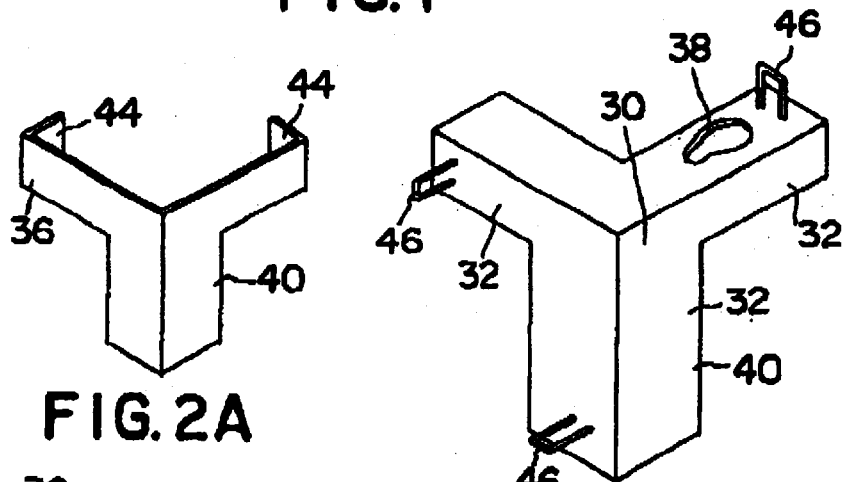
FIG. 2B
FIG. 3

THREE DIMENSIONAL COMPOSITE JOINT REINFORCEMENT FOR AN AUTOMOTIVE VEHICLE

CROSS REFERENCE TO RELATED APPLICATION

This application is a continuation in part of Ser. No. 09/018,387, filed Feb. 4, 1998.

TECHNICAL FIELD

The present invention relates generally to reinforcement of hollow structural members and, more specifically, to reinforcement of hollow structures of automotive vehicles that are generally inaccessible after assembly.

BACKGROUND OF THE INVENTION

Impact resistance, fuel economy standards and structural rigidity are important fundamental concerns in automotive structural design. Fuel economy standards dictate the use of lighter materials. This usually translates into reducing the thickness of materials or using lighter weight material. Impact resistance dictates the use of thicker materials at least in localized areas. Structural rigidity also typically requires an increase of material.

The use of composite materials which are generally stronger and lighter than their metallic counterparts has increased over the years. The present inventor has pioneered a novel approach to structural part reinforcement through localized reinforcement of critical regions using microsphere-filled thermally expandable resins, such as: composite door beam which has a resin based core that occupies one-third of the bore of a metal tube; a hollow laminate beam characterized by high stiffness-to-mass ratio and having an outer portion which is separated from an inner tube by a thin layer of structural foam; a W-shaped carrier insert reinforcement which carries a foam body for use in reinforcing a hollow beam; a bulk head that utilizes a thermally expandable foam to provide localized reinforcement of a rail for the attachment of an engine cradle or the like.

Joints of an automotive vehicle are the weakest part of the structure. Stiffening the joint improves the overall stiffness in ride characteristics of the vehicle. In the formation of the automotive vehicle body, several structural/body panel members are welded or bonded together. The joints typically are hollow by their very nature. The hollow structure allows the flow of E-coat through the structural members to increase corrosion resistance. Various techniques have been used by automotive manufacturers to increase the rigidity of the joints of the vehicle. Typically, the solutions have involved substantially increasing the bulk, size and/or complexity of the joints to thereby increase rigidity. By increasing the bulk of the joints, precious packaging space has been reduced. Also, the weight of the structure due to its bulk has been increased.

SUMMARY OF THE INVENTION

It is therefore one object of the invention to reinforce a joint of an automotive vehicle without having to increase the amount of sheet metal required in the joint.

In one aspect, the present invention provides a carrier portion having an outer surface. The outer surface has a plurality of extensions that conform to the joint into which the joint reinforcement is to be placed. An adhesive layer is disposed on the outer surface of the carrier portion. The outer surface is substantially covered by the adhesive layer. The adhesive layer is formed of a thermally expandable resin material.

In another aspect, the invention provides a method of forming a reinforcement member. The method comprises the steps of providing a carrier portion; applying a layer of adhesive material to the carrier portion; heating the carrier portion and the adhesive portion; and bonding the adhesive portion to the structural member.

In yet another aspect, the present invention provides a method of forming an automotive body having at least two body members. The assembly of the body members defines a hollow space therebetween. The method includes the steps of forming a reinforcement member by applying a layer of adhesive material to a carrier portion; inserting the reinforcement member in the hollow space; and heating the body members and the carrier portion with the adhesive layer so that the adhesive material bonds to the body members.

One advantage of the present invention is that a reduced packaging space can be provided for the body members. This is in part due to the fact that a lower gauge sheet metal may be utilized in all the body members since the structural joints have been reinforced. This results in a desirable overall reduction in weight of the automotive vehicle.

BRIEF DESCRIPTION OF THE DRAWINGS

Other features and advantages of the invention will become apparent from the Detailed Description which should be read in conjunction with the drawings in which:

FIG. 1 is a cutaway perspective view of an automotive vehicle having a structural reinforcement member;

FIGS. 2a and 2b are perspective views of two portions of a carrier member;

FIG. 3 is a perspective view of a carrier wrapped with an adhesive layer;

DETAILED DESCRIPTION OF THE PREFERRED EMBODIMENT

Figure 4:
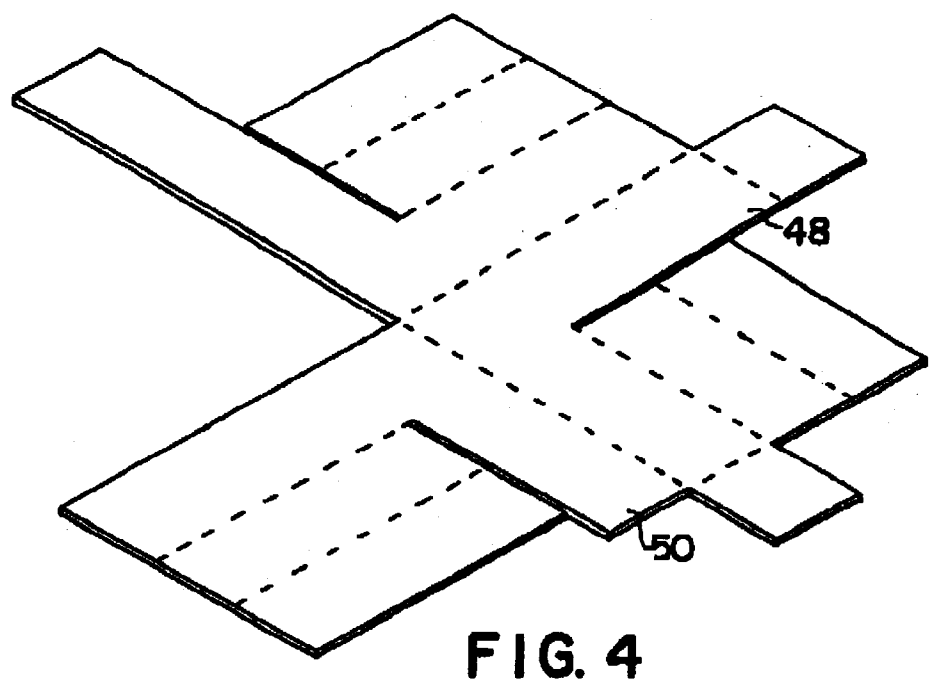
FIG. 4 is a plan view of a sheet of adhesive material to be applied to a carrier.

In the following figures, like reference numerals will be used to represent like components. The figures illustrate a carrier member having a particular shape. Other shapes and sizes for a joint reinforcement, however, would be evident to those skilled in the art based on the teachings herein.

Referring now to FIG. 1, an automotive vehicle 10 is shown having a joint 12. Joint 12 is a hollow structure 13 defined by inner rear quarter panel 14, outer rear quarter panel 16, inner door panel 18 and outer door panel 20. A reinforcement member 22 is inserted within hollow structure 13 to strengthen joint 12. Although reinforcement member 22 is shown illustrated within a particular joint, the present invention has application to the many joints of an automotive vehicle. As shown, the reinforcement member extends between the roof 24 and D-pillar 26. Reinforcement member 22 is particularly suitable for reinforcing the area where three hollow channels 28 intersect. However, a modified reinforcement member 22 may also be suitable for reinforcing the intersection of two channels. Reinforcement member 22 has a body portion or connection section 30 and three extension portions 32. Each extension portion 32 has a longitudinal axis 34. Longitudinal axes 34 preferably coincide with the elongated axis of each of channels 28. That is, reinforcement members 22 may be constructed so that longitudinal axes 34 are at various angles with respect to each other. Longitudinal axes 34 may be perpendicular to each other to coincide with channels 28 to correspond to the various angles of an automotive vehicle design.

The length of extension portions 32 from body portions 30 are a function of the amount of joint 12 to be reinforced. Various distances may be reinforced within channels 28 depending on the body structure into which reinforcement member 22 is applied. In most applications, extension portions 32 will extend several inches from body portion 30.

As shown, extension portions 32 have a generally square cross-section. However it is preferred that extension portions 32 be shaped similarly to that of channels 28. In this manner, a better fit may be achieved between reinforcement member and channels 28.

Referring now to FIGS. 2A, 2B and 3, reinforcement member 22 is preferably formed of a carrier 36 wrapped by an adhesive layer 38. Carrier 36 is preferably formed of a thin material capable of supporting adhesive layer 38. The amount of support provided by carrier 36 is enough so that reinforcement member 22 may be handled and placed into the hollow structure of the automotive vehicle during manufacturing without deforming. Carrier 36 may, for example, be formed of a metallic material such as an aluminum sheet, a steel sheet or an aluminum foil. Suitable thicknesses of such material may be, for example, 0.007 0.015 inches thick, 0.006 0.025 inches thick and 0.002 0.006 inches thick respectively. Other materials suitable for use as a carrier are injected molded glass filled nylon, 0.062 0.25 inches thick, blow molded or rotational molded high temperature plastic, 0.06 0.25 inches thick (abs or polystyrene) or rotational molded or cast cement foam, 0.25 0.5 inches thick. Of course, the various thicknesses may vary depending on the particular circumstances.

Several methods for forming carrier 36 may be used depending on the carrier material. As illustrated in FIGS. 2A and 2B, two pieces of aluminum or steel may be stamped to form two halves 40 and 42 of carrier 36. Halves 40 and 42 may then be welded or snapped together to form carrier 36. As shown, half 40 has ends 44 along each extension portion 32. In the preferred embodiment, though, carrier 36 either does not have ends 44 or has holes within ends 44 to allow the passage of E-coat during manufacturing to increase corrosion protection. The addition of ends 44, however, further increases the strength of carrier 36.

Carrier 36 may also be formed by placing a foil backed sheet over a foam three-dimensional core. Carrier 36 may also be formed by blow molding, injection molding, casting foam cement around a Styrofoam core, or utilizing an aluminum shell or can as the internal carrier with processes based on techniques for forming aluminum beverage cans. Carrier 36 may also be formed by hydro forming a metal into a three-dimensional shape.

After or during the formation of carrier 36, metal extensions such as pins 46 or metal tabs may be added to carrier 36. Pins 46 align with holes in or near joints 12. The number of pins 46 may vary with each application. The pins locate reinforcement member 22 within channels 28 during assembly of the vehicle. Channels 28 may have holes therethrough that align with pins 46.

The polymer used to form adhesive layer 22 is a resin-based material which is thermally expandable. A number of resin-based compositions can be utilized to form adhesive layer 38 in the present invention. The preferred compositions impart excellent strength and stiffness characteristics while adding only marginally to the weight. With specific reference now to the composition of adhesive layer 38, the density of the material should preferably be from about 20 pounds per cubic foot to about 50 pounds per cubic foot to minimize weight. The melting point, heat distortion temperature, and the temperature at which chemical breakdown occurs must be sufficiently high such that adhesive layer 38 maintains its structure at high temperatures typically encountered in paint ovens and other vehicle assembly processing. Therefore, adhesive layer 38 should be able to withstand temperatures in excess of 320° F., and preferably 350° F. for short times. Also, adhesive layer 38 should be able to withstand in final service heats of about 90° F. to 200° F. for extended periods of time without exhibiting substantial heat-induced distortion or degradation.

In more detail, in one particularly preferred embodiment, the thermally expanded structural foam of adhesive layer 38 includes a synthetic resin, a cell-forming agent, and a filler. A synthetic resin comprises from about 40% to about 80% by weight, preferably from about 45% to about 75% by weight, and most preferably from about 50% to about 70% by weight of adhesive layer 38. Most preferably, a portion of the resin includes a flexible epoxy. As used herein, the term "cell-forming agent" refers generally to agents which produce bubbles, pores, or cavities in adhesive layer 38. That is, adhesive layer 38 has a cellular structure, having numerous cells disposed throughout its mass. The cellular structure provides a low density, high strength material, which provides a strong, yet lightweight structure. Cell forming agents which are compatible with the present invention include reinforcing "hollow" microspheres or microbubbles which may be formed of either glass or plastic. Glass microspheres are particularly preferred. Also, the cell-forming agent may comprise a blowing agent which may be either a chemical blowing agent or a physical blowing agent. Where the cell-forming agent comprises microspheres or macrospheres, it constitutes from about 10% to 50% by weight, preferably from about 15% to about 40% by weight, and most preferably from 20% to about 40% by weight of the material which forms adhesive layer 22. Where the cell-forming agent comprises a blowing agent, it constitutes from about 0.5% to about 5.0% by weight, preferably from about 1% to about 4.0% by weight, and most preferably from about 1% to about 3% by weight of adhesive layer 38. Suitable fillers include glass or plastic microspheres, fumed silica, cathium carbonate, milled glass fiber, and chopped glass strand. A thixotropic filler is particularly preferred. Other materials may be suitable. The filler comprises from about 1% to about 15% by weight, preferably from about 2% to about 10% by weight, and most preferably from about 3% to about 8% by weight of adhesive layer 38.

Preferred synthetic resins for use in the present invention include thermosets such as epoxy resins, phenol ester resins, thermoset polyester resins, and urethane resins. It is not intended that the scope of the present invention be limited by molecular weight of the resin and suitable weights will be understood by those skilled in the art based on the present disclosure. Where the resin component of the liquid filler material is a thermoset resin, various accelerators such as imidizoles and curing agents, preferably dicyandiamide may also be included to enhance the cure rate. A functional amount of accelerator is typically from about 0.5% to about 2.0% of the resin weight with corresponding reduction in one of the three components, resin, cell-forming agent or filler. Similarly, the amount of curing agent is typically from about 1%, to about 8% of the resin weight with a corresponding reduction in one of the three components, resin, cell-forming agent or filler. Effective amounts of processing aids, stabilizers, colorants, UV-absorbers and the like may also be included in the layer. Thermoplastics may also be suitable.

In the following table, a preferred formulation for adhesive layer 38 is set forth. It has been found that this formulation provides a material which fully expands and cures at about 320° F. and provides excellent structural properties. All percentages in the present disclosure are percent by weight unless otherwise specifically designated.

| Ingredient | Percentage by Weight |
| --- | --- |
| Penisula Polymers PEP 6134 Resin (High viscosity DGEBPA epoxy resin) | 57.57 |
| Zeon Nipol Rubber 1312 (Acrylonitrile/Butadiene Polymer) | 4.33 |
| Zeneca Win nofil SPT (CaCO$_3$) | 5.82 |
| Cabot Monarch 120 (Carbon Black) | 0.13 |
| Cabot Foamed Silica ts 720 (Thixotrope) | 3.52 |
| 3M Glass Microspheres B38 | 22.26 |
| Air Products Amicure UR | 1.29 |
| 5KW Di-Cy Dihard G03 | 4.33 |
| Uniroyal Celogen OT | 0.75 |

In addition colorings and other additives may be included such as Phtalocyanine blue and KR55.

Although thermally expandable adhesive materials have been particularly described other adhesives may also be used. Preferably the adhesive functions as a structural foam. Preferably, but not necessarily, the adhesive is expandable. The adhesive may be thermally or chemically activated. The adhesive may be a thermoset material.

Adhesive layer 38 in most applications is a layer extending around or substantially around the entire outer surface of carrier 36. It is preferred that adhesive layer 38 is of relatively uniform thickness, for example, from about 2 to about 6 mm, in the unexpanded state.

Referring now to FIG. 4, adhesive layer 38 may be prepared by die cutting a sheet 48 of resin to the required geometry. The die cut portion 50 is then wrapped around the three-dimensional carrier 36. Alternatively, other forms of coating carrier 36 may be used. For example, adhesive layer 38 may be applied by spraying or compression molding.

Figure 5:
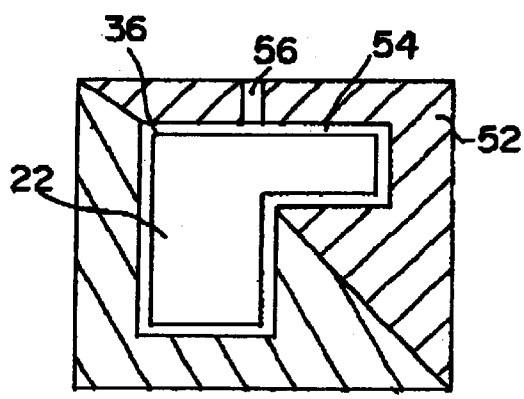
FIG. 5 is a cross-sectional view of a carrier within a mold.

Referring now to FIG. 5, another method for applying adhesive layer 38 to carrier 36 is by the use of a mold 52. Carrier 36 is located within a mold 52. A gap 54 between mold 52 and carrier 36 is preferably uniform and sized to the desired thickness of adhesive layer 38. A port 56 is provided through mold 52 so that molten adhesive layer material may be injected into gap 54 to surround carrier 36.

It is preferred that mold 52 is cooled and polished to ease part release. This may be done in several manners such as by running coolant fluids through mold body 52. By cooling mold 52, separating adhesive layer 38 from mold 52 is simplified.

Figure 6:
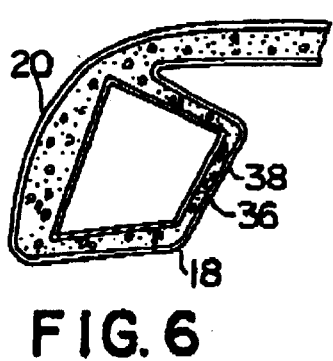
FIG. 6 is a cross-sectional view of a reinforcement member in a hollow structure of an automotive vehicle.

Referring now to FIG. 6, a cross-sectional view of a reinforcement member 22 formed according to FIGS. 3, 4 or 5 as shown. Adhesive layer 38 is applied uniformly around carrier 36. Carrier 36 is preferably hollow and generally conforms to channel 28. Adhesive layer 38 has the characteristics that when the vehicle is subjected to paint baking, adhesive layer 38 expands and bonds to channels 28. Thus, after adhesive layer 38 cools, the adhesive layer 38 bonds to channels 28 to reinforce joint 12. Because the joints of vehicle are structurally reinforced, vehicle stiffness and ride characteristics are improved which allow for weight reduction by reducing the gauge of metal provided to form the body panels of the vehicle.

Figure 7:
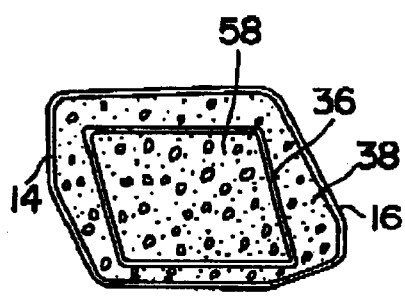
FIG. 7 is an alternative cross-sectional view of a reinforcement member having a foam interior in a hollow structure of an automotive vehicle.

Referring now to FIG. 7, a cross-sectional view of an alternative method for forming reinforcement member 22 is shown. Instead of having a hollow shell as in FIG. 6, carrier 36 is formed having a foam core 58. A foil or metallic layer forms carrier 36. For example, an aluminum foil may be wrapped around foam core 58. Using a form core 58, adhesive layer 38 may be applied in any of the above specified manners. Foam core 58 is preferably formed of a thermally activated or fugitive material. That is, when the foam core is subject to heat, the form core breaks down to leave a hollow carrier 36. The heat preferred for foam core 58 to break down is at a maximum temperature to which the vehicle is subject to during paint bake operation. By using a foam core 58, a slightly more rigid reinforcement member 22 is obtained and thus reinforcement member 22 may be easier to handle during vehicle assembly, especially when foil carriers are used.

In operation, reinforcement members 22 as described above would likely be supplied to automotive vehicle assembly plants. Reinforcement members may be manufactured according to any of the methods set forth above. During the assembly of the vehicle body and before welding or masticing of the various body panels, reinforcement members would be placed at various joints of the vehicle. Preferably, any joints and adhesive layer 38 align with any of the seams in the body of the vehicle. After the reinforcement members 22 are inserted in the joints, the body panels are joined together. Commonly, the vehicle body once welded together is subjected to E-coat. During E-coat, the body is dipped into a pool of E-coat. E-coat flows through the hollow reinforcement member 22 to coat the body including the interior of channels 28.

Subsequently, paint is then applied to the body panels. After paint is applied to the body panels, the paint is baked. During this baking process, the temperature of the body panels is substantially raised. Commonly, body temperatures exceed 325° F. The temperature of the interior of channels 28 also is raised to that temperature. This temperature then activates the adhesive layer 38 so that it expands and bonds with the interior of the body panels within channels 28. When cooled, reinforcement member 22 is bonded to the body panels and the joint is then reinforced.

While the best mode for carrying out the present invention has been described in detail, those familiar with. the art to which this invention relates will recognize various alternative designs and embodiments for practicing the invention as defined by the following claims. For example, while the invention is particularly useful as a joint reinforcement for the hollow structure of an automotive vehicle, the invention may also be practiced for reinforcing other hollow structures such as various composites, furniture, appliances, aircraft and farm equipment.

What is claimed is:

1. A joint reinforcement member for use in reinforcing a hollow structure comprising a carrier portion having an outer surface, said carrier portion having a base portion, a first extension secured to and extending away from said base portion, a second extension secured to and extending away from said base portion, said base portion connecting said first extension to said second extension to form a continuous integral outer surface of said first extension to said second extension, each of said first extension and said second extension being longer than said base portion, each of said first extension and said second extension having a longitudinal axis, said longitudinal axis of said first extension being non-collinear with said longitudinal axis of said second extension, said longitudinal axis of said first extension and said longitudinal axis of said second extension intersecting at said base portion, and an adhesive layer bonded to said outer surface and substantially covering said outer surface.

2. A joint reinforcement member as recited in claim 1, wherein said first longitudinal axis is perpendicular to said second longitudinal axis.

3. A joint reinforcement member as recited in claim 1, wherein said carrier portion comprises a third extension extending from said base portion, said third extension having a third longitudinal axis.

4. A joint reinforcement member as recited in claim 3, wherein said third longitudinal axis is substantially perpendicular to said first and second longitudinal axes.

5. A joint reinforcement member as recited in claim 3 wherein said base portion connects said third extension with each of said first extension and said second extension to form a continuous integral outer surface of said third extension with each of said first extension and said second extension.

6. A joint reinforcement member as recited in claim 5 wherein said base portion and each of said extensions are of tubular shape.

7. A joint reinforcement member as recited in claim 6 wherein said carrier portion is filled with a core foam.

8. A joint reinforcement member as recited in claim 6 wherein said carrier portion is hollow and empty.

9. A joint reinforcement member as recited in claim 1, wherein said carrier portion is hollow.

10. A joint reinforcement member as recited in claim 1, wherein said outer surface having a metallic or plastic layer.

11. A joint reinforcement member as recited in claim 1, wherein said carrier portion having through holes.

12. A joint reinforcement member as recited in claim 1 wherein said base portion and each of said extensions are of tubular shape.

13. A joint reinforcement member as recited in claim 12 wherein said carrier portion is filled with a core foam.

14. A joint reinforcement member as recited in claim 12 wherein said carrier portion is hollow and empty.

15. A joint reinforcement member for a hollow structure comprising:
    a carrier portion having an outer surface, said carrier portion having a base portion having a first extension having a first longitudinal axis extending therefrom and having a second extension having a second longitudinal axis extending therefrom; an adhesive layer disposed on said outer surface and substantially covering said outer surface; and wherein said carrier portion has metal extensions extending therefrom.

16. A joint reinforcement member for a hollow structure comprising:
    a carrier portion having an outer surface, said carrier portion having a base portion having a first extension having a first longitudinal axis extending therefrom and having a second extension having a second longitudinal axis extending therefrom;
    an adhesive layer disposed on said outer surface and substantially covering said outer surface; and wherein said carrier portion comprises two stamped metal channels coupled together.

17. A joint reinforcement member for a hollow structure comprising:
    a carrier portion having an outer surface, said carrier portion having a base portion having a first extension having a first longitudinal axis extending therefrom and having a second extension having a second longitudinal axis extending therefrom;
    an adhesive layer disposed on said outer surface and substantially covering said outer surface; and wherein said carrier portion comprises a foil coated foam member, said foil forming said outer surface.

18. A joint reinforcement member as recited in claim 17, wherein said foam member is heat activated.

19. A joint reinforcement member for a hollow structure comprising:
    a carrier portion having an outer surface, said carrier portion having a base portion having a first extension having a first longitudinal axis extending therefrom and having a second extension having a second longitudinal axis extending therefrom;
    an adhesive layer disposed on said outer surface and substantially covering said outer surface; and wherein said adhesive layer comprises by percentage weight, synthetic resin between about 40% and about 80%, filler between about 1% and about 15%, and chemical blowing agent between about 0.5% and about 5%.

20. A joint reinforcement member as recited in claim 19 wherein said adhesive layer further comprises from about 10 to 50% by weight hollow glass microspheres.

21. A method of reinforcing a hollow structural member formed by at least two offset passageways which are connected at a joint comprising providing a carrier portion having a plurality of extensions extending from a base portion corresponding to the hollow structure with each of the extensions being connected together by the base portion to form a continuous integral outer surface of each pair of extensions and with each extension being longer than the base portion, applying a layer of adhesive material to the carrier portion, locating each of the extensions in a respective passageway with the base portion being at the joint of the passageways, and bonding the adhesive layer to the structural member.

22. The method of claim 21 wherein there are three offset connecting passageways and three corresponding extensions, and locating each extension in a corresponding passageway.

23. The method of claim 22 each of the extensions and the base portion are of tubular form, and including the step of filling the tubular form with a foam core.

24. The method of claim 22 each of the extensions and the base portion are of tubular form, and including maintaining the tubular form hollow and empty.

25. The method of claim 21 wherein the offset connecting passageways are located at a joint between the roof and the pillar of an automobile vehicle.

26. A method of forming a reinforcement member for placement within a hollow structure member comprising:
    providing a carrier portion having a plurality of extensions extending from a base portion corresponding to the hollow structure;
    applying a layer of adhesive material to said carrier portion;
    heating the carrier portion and the adhesive layer;
    activating the adhesive layer;
    bonding the adhesive layer to a structural member; and
    cooling the structural member and the adhesive layer; and further comprising the step of cutting the adhesive layer from a sheet of adhesive material.

27. A method of forming a reinforcement member for placement within a hollow structure member comprising:

provid ing a carrier portion having a plurality of extensions extending from a base portion corresponding to the hollow structure;

applying a layer of adhesive material to said carrier portion;

wherein the step of applying the layer of adhesive material further comprises the sub-steps of placing the carrier portion in a mold; injecting the adhesive layer between the carrier portion and the mold; and, removing the carrier portion having the adhesive layer from the mold.

28. A method of forming a body having at least two elongated hollow body members, the assembly of said body members defining a hollow space therebetween comprising:

inserting a reinforcement member in the hollow space, the reinforcement member having a carrier portion having an outer surface and a base portion having a first extension having a first longitudinal axis extending therefrom and having a second extension having a second longitudinal axis extending therefrom, the outer surface of the carrier having an adhesive layer disposed thereon;

aligning the first extension with the one of the hollow body members;

aligning the second extension with the other of the hollow body members;

bonding the adhesive material within the hollow body members;

and further comprising the steps of forming the adhesive layer by cutting the adhesive layer from a sheet of adhesive material.

29. A method of forming an automotive body as recited in claim 27, further comprising the step of applying the layer of adhesive to the carrier portion.

30. A method of forming an automotive body as recited in claim 27, wherein the step of applying the layer of adhesive to the carrier comprises the sub-steps of placing the carrier portion in a mold; injecting the adhesive layer between the carrier portion and the mold; and, removing the carrier portion having the adhesive layer from the mold.

* * * * *